(12) United States Patent
Hashimoto et al.

(10) Patent No.: US 7,032,635 B2
(45) Date of Patent: Apr. 25, 2006

(54) PNEUMATIC TIRE FOR USE ON ICED AND SNOWED ROAD SURFACES

(75) Inventors: Yoshimasa Hashimoto, Hiratsuka (JP); Hirohisa Hazama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 202 days.

(21) Appl. No.: 10/464,644

(22) Filed: Jun. 19, 2003

(65) Prior Publication Data

US 2003/0234065 A1 Dec. 25, 2003

(30) Foreign Application Priority Data

Jun. 24, 2002 (JP) ............... 2002-182950

(51) Int. Cl.
*B60C 11/117* (2006.01)
*B60C 11/12* (2006.01)

(52) U.S. Cl. .................. 152/209.17; 152/209.18; 152/209.25; 152/DIG. 3; 152/902

(58) Field of Classification Search ........... 152/209.17, 152/209.18, 209.25, DIG. 3, 902
See application file for complete search history.

(56) References Cited

U.S. PATENT DOCUMENTS 4,934,424 A * 6/1990 Kojima ............... 152/DIG. 3
5,301,727 A * 4/1994 Inoue ................... 152/DIG. 3
5,873,399 A * 2/1999 Ochi et al. ............. 152/DIG. 3
6,000,450 A * 12/1999 Kishimoto et al. ..... 152/DIG. 3
6,571,844 B1 * 6/2003 Ochi et al. ............. 152/DIG. 3
2002/0007889 A1 * 1/2002 Eromaki ................ 152/209.17

FOREIGN PATENT DOCUMENTS

| JP | 3-38406 | * | 2/1991 |
| JP | 5-162511 | * | 6/1993 |
| JP | 2001-277817 A1 | | 3/2000 |
| JP | 2000-289413 | * | 10/2000 |

* cited by examiner

*Primary Examiner*—Steven D. Maki
(74) *Attorney, Agent, or Firm*—Rader, Fishman & Grauer PLLC

(57) ABSTRACT

A pneumatic tire for use on iced and snowed road surfaces has a tread surface. The tread surface has a plurality of main grooves extending in a circumferential direction of the tire and a plurality of lateral grooves extending in a width direction of the tire. Blocks are defined by the main grooves and the lateral grooves. The blocks have a ground contact face which has a plurality of pairs of sipes comprising a left sipe and a right sipe extending in the tire width direction. The plurality of pairs of sipes are placed in a predetermined interval in the tire circumferential direction. Each of the left and right sipes of each pair extends from a width-directional center portion of the ground contact face of the block toward each way of the tire width direction so as to open its outer end to each side face of the block.

11 Claims, 4 Drawing Sheets

Prior Art

PNEUMATIC TIRE FOR USE ON ICED AND SNOWED ROAD SURFACES

BACKGROUND OF THE INVENTION

The present invention relates to pneumatic tires for use on iced and snowed road surfaces and, more particularly, to a pneumatic tire suitable for use on iced and snowed road surfaces which can improve iced road surface running performance and uneven wear resistance.

In general, pneumatic tires for use on iced and snowed road surfaces have a tread surface on which a block pattern is formed. A ground contact face of each of the blocks has a plurality of sipes extending in a width direction of the tire. The tread rubber portion consists of low hardness rubber. The edges of the blocks and the sipes provide a high scratching effect and a high water removing effect while a high friction force by adhesion of the tread rubber portion allows a larger ground contact area of the tread surface to be obtained, thereby showing high iced road surface running performance.

In recent years, anti-lock braking systems have come into use, and are mounted on a variety of vehicles. During braking, vehicles employing a conventional braking system keep the ground contact surface of the tire in the same position (the same block portions of the tread surface contact a road surface), whereby ice and/or snow adhering to the blocks of the ground contact surface and entering into the sipes is melted by friction heat produced during sliding on a snowed and iced road surface, and the blocks surely come into contact with the snowed and iced road surface. Vehicles employing an anti-lock braking system, however, always change the ground contact surface of the tire during braking, thereby ice and/or snow adhering to the blocks and entering into the sipes can not be fully melted, resulting in that the ground contact area of the blocks against a snowed and iced road surface is reduced and the edge effect of the sipes is lowered. Therefore, a distance running during braking tends to be longer and there is a problem of lowering iced road surface running performance.

Pneumatic tires have also been mentioned that uneven wear resistance of blocks is lowered due to lowering of block rigidity by formation of a plurality of sipes on the blocks.

SUMMARY OF THE INVENTION

It is an object of the present invention to provide a pneumatic tire for use on iced and snowed road surfaces in which iced road surface running performance and uneven wear resistance can be improved.

To achieve the above object, a pneumatic tire for use on iced and snowed road surfaces, according to the present invention, has a tread surface, the tread surface having a plurality of main grooves extending in a circumferential direction of the tire and a plurality of lateral grooves extending in a width direction of the tire, blocks being defined by the main grooves and the lateral grooves, the blocks having a ground contact face which has a plurality of pairs of sipes comprising a left sipe and a right sipe extending in the tire width direction, the plurality of pairs of sipes being placed in a predetermined interval in the tire circumferential direction, each of the left and right sipes of each pair extending from a width-directional center portion of the ground contact face of the block toward each way of the tire width direction so as to open its outer end to each side face of the block.

As mentioned above, two left and right sipes forming a pair extend from the width-directional center portion of the ground contact face of the block towards both ways of the tire width direction and are opened to the side faces of the block, thereby allowing the length of one sipe to be shorter while maintaining the edge amount of the sipes in the substantially same level as the prior art sipe. This can, therefore, make it difficult for snow and/or ice to enter into the sipes, resulting in that the edge effect of the sipes can be enhanced during operation of an anti-lock braking system.

A plurality of pairs of left and right sipes are placed in the ground contact face of the block in a predetermined interval in the tire circumferential direction, whereby a block comprises small left and right, back and forth arranged block sections defined by the sipes. As a result, rigidity of the block can be more even than that of the prior art and ground contact characteristics can be improved.

Accordingly, iced road surface running performance and uneven wear resistance can be improved due to enhancement of the edge effect of the sipes and ground contact characteristics.

DETAILED DESCRIPTION OF THE PREFERRED EMBODIMENT

Figure 1:
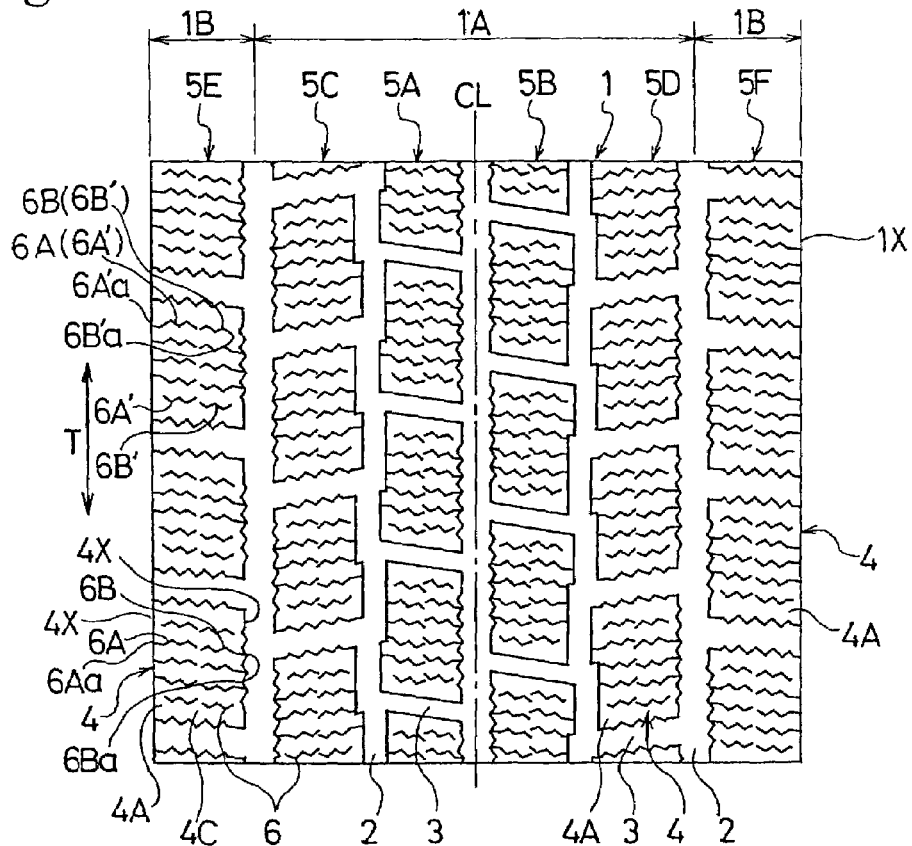
FIG. 1 is a partial developed view of a tread surface showing one embodiment of a pneumatic tire for use on iced and snowed road surfaces according to the present invention.

Embodiments of the present invention will be described below with reference to the drawings. Like elements are referred by the like reference characters, and duplicated description of these elements will be omitted.

Referring to FIG. 1, an embodiment of a pneumatic tire suitable for use on iced and snowed road surfaces according to the present invention is shown, having a tread surface 1. The tread surface 1 has a plurality (five grooves in the drawing) of main grooves 2 extending in a circumferential direction T of the tire. One main groove 2 is formed on the tire centerline CL, and four remaining main grooves 2 are symmetrically placed on left and right sides thereof, two of the four remaining main grooves 2 being placed on each side, respectively. The tread surface 1 comprises a center portion 1A between two outermost main grooves 2, and a shoulder portion 1B outside each of the two outermost main grooves 2.

Lateral grooves 3 extending in a width direction of the tire are placed in a predetermined pitch along the tire circumferential direction T, and are in communication with the main grooves 2. A large number of blocks 4 are defined by the main grooves 2 and the lateral grooves 3 on the tread surface 1, and the blocks 4 are separated by the main grooves 2 into six rows of blocks 5A~5F. Each of the blocks 4 has a ground contact face 4A which has a plurality of sipes 6 extending in a zig zag path in the tire width direction.

The plurality of sipes 6 comprise five or six pairs of sipes each pair of which consist of a left sipe 6A and a right sipe 6B, the pairs of sipes being placed in a predetermined interval along the tire circumferential direction T. The left and right sipes 6A and 6B of each pair extend towards both ways of the tire width direction from a width-directional center portion 4C of the ground contact face 4A of each block 4. Pairs of left and right sipes 6A' and 6B' positioned in both outermost locations in the tire circumferential direction have an outer end 6A'a, 6B'a, which is located within the block 4 and is not opened to the left or right side face 4X. Intermediate pairs of left and right sipes 6A and 6B positioned between the outer pairs of sides 6A' and 6B' have an outer end 6Aa, 6Ba, which is opened to the left or right side face 4X.

Figure 2:
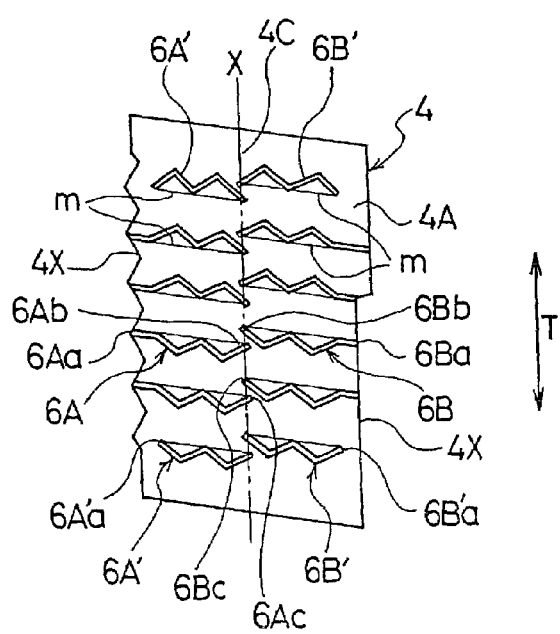
FIG. 2 is an enlarged view of a block in block rows positioned on both sides of the tire centerline in FIG. 1.
Figure 3:
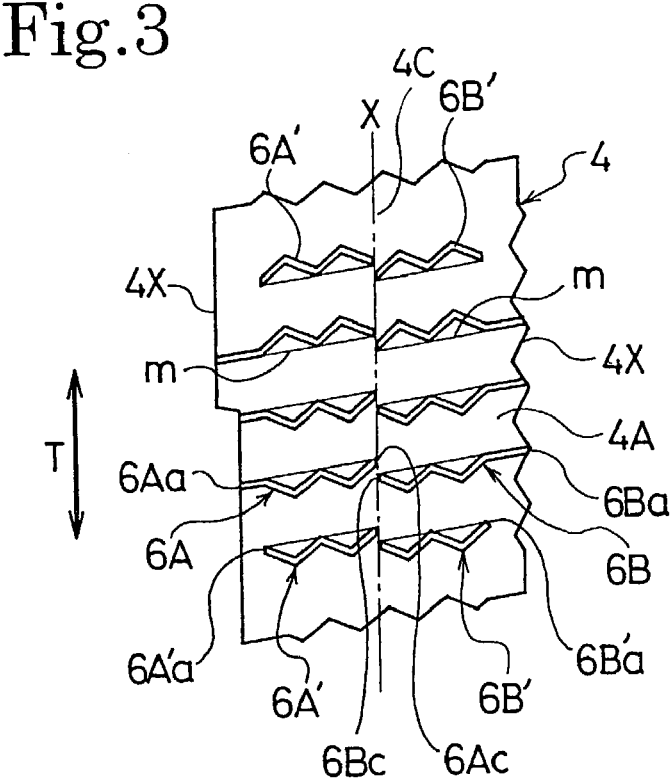
FIG. 3 is an enlarged view of a block in block rows positioned on both sides of the block rows on the both sides of the tire centerline in FIG. 1.
Figure 4:
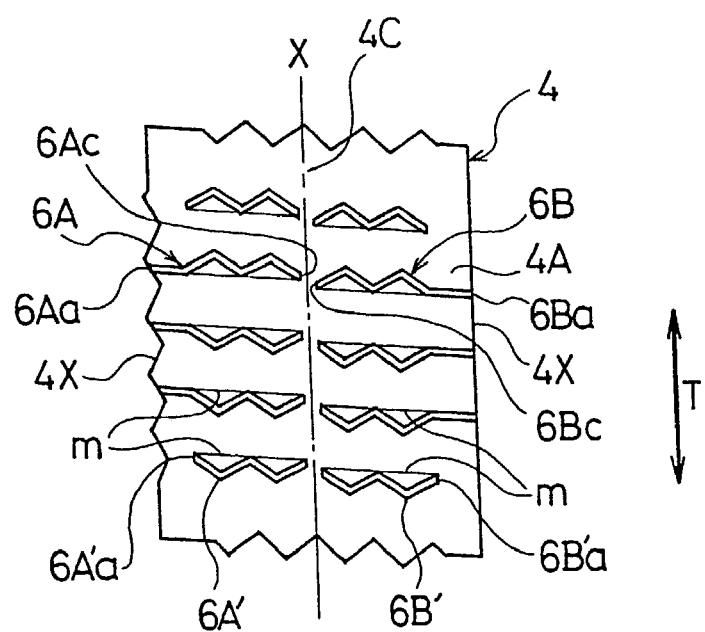
FIG. 4 is an enlarged view of a block in block rows positioned in shoulder portions in FIG. 1.

As shown in FIGS. 2 to 4, the left and right sipes 6A and 6B have an extension line m extending in an extending direction thereof, the extension lines m of the left sipes 6A located in the same block 4 being parallel to each other, the extension lines m of the right sipes 6B located in the same block 4 being parallel to each other. The left and right sipes 6A and 6B of each pair are offset with respect to the tire circumferential direction T.

The center portion 1A of the tread surface 1 has four rows of blocks 5A, 5B, 5C and 5D and, as shown in FIG. 2, the left and right sipes 6A and 6B provided on the ground contact face 4A of each block 4 in two inner rows of blocks 5A and 5B which are on the both sides of the tire centerline CL and are adjacent thereto, have an inner end portion 6Ab, 6Bb, which extends beyond the centerline X in the width-directional center portion 4C of the block 4, the inner end portions 6Ab and 6Bb overlapping to each other when viewed from the tire circumferential direction T.

The left and right sipes 6A and 6B disposed on the ground contact face 4A of each block 4 in two outer rows of blocks 5C and 5D, as shown in FIG. 3, have an inner end 6Ac, 6Bc, which is located on the centerline X.

The left and right sipes 6A and 6B provided on the ground contact face 4A of each block 4 in rows of blocks 5E and 5F positioned in the shoulder portions 1B, as shown in FIG. 4, have an inner end portion which does not extend to the centerline X, the inner ends 6Ac and 6Bc thereof being away from the centerline X.

In accordance with the present invention described above, the left and right sipes 6A and 6B forming a pair extend from the width-directional center portion 4C of the ground contact face 4A of the block 4 towards both ways of the tire width direction and are opened to the side faces 4X of the block 4, thereby allowing the length of one sipe to be shorter while maintaining the edge amount of the sipes 6A and 6B in the substantially same level as the prior art sipe. This can, therefore, make it difficult for snow and/or ice to enter into the sipes 6A and 6b. As a result, the edge effect of the sipes 6A and 6B can be enhanced during operation of an anti-lock braking system.

A plurality of pairs of left and right sipes 6A and 6B are placed on the same block 4 in a predetermined interval along the tire circumferential direction T, whereby a block 4 comprises small left and right, back and forth arranged block sections defined by the sipes 6A and 6B. Thus, rigidity of the block can be more even than that of the prior art and ground contact characteristics can be enhanced.

Accordingly, iced road surface running performance and uneven wear resistance can be improved due to enhancement of the edge effect of the sipes and ground contact characteristics.

The offset of the left and right sipes 6A and 6B with respect to the tire circumferential direction enables the inner ends 6Ac and 6Bc to be dispersed in the tire circumferential direction T, thereby allowing a more even distribution of the ground contact pressure of the block 4, resulting in obtaining iced road surface running performance which is more improved.

The outer ends 6A'a and 6B'a of the left and right sipes 6A' and 6B' located in both outermost positions in the tire circumferential direction are positioned within the block 4, thereby allowing rigidity of the front and back end portions of the block 4 to be increased, which makes it difficult for snow and ice to enter into the sipes 6A' and 6B'and enables a further more even distribution of ground contact pressure of the block 4. As a result, iced road surface running performance and uneven wear resistance can be further improved.

In the present invention, it is preferable, as described above, that the left and right sipes 6A and 6B be offset with respect to the tire circumferential direction T. The left and right sipes 6A and 6B, however, may be arranged in a line without offsetting, as shown in FIGS. 5 and 6.

It is desirable, as described above, that the outer ends 6A'a and 6B'a of the left and right sipes 6A' and 6B' positioned in the both outermost locations be located within the block 4. The outer ends 6A'a and 6B'a of the left and right sipes 6A' and 6B', however, may be opened to the side faces 4X of the block 4 in a way similar to the intermediate left and right sipes 6A and 6B, as shown in FIGS. 7 and 8.

Figure 5:
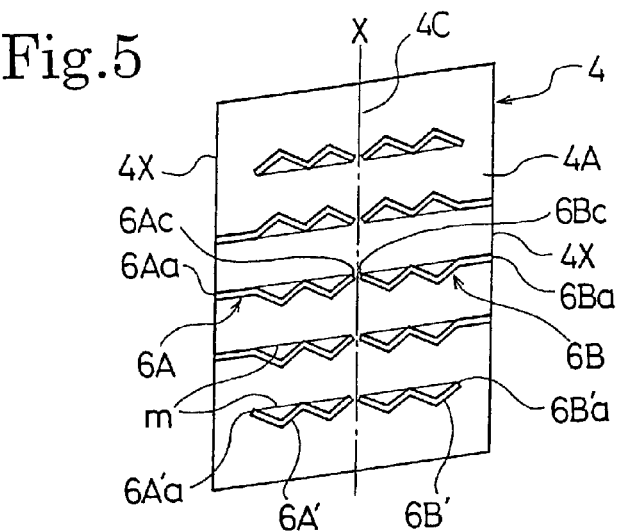
FIG. 5 is an enlarged view of a block having alternative pairs of sipes.
Figure 6:
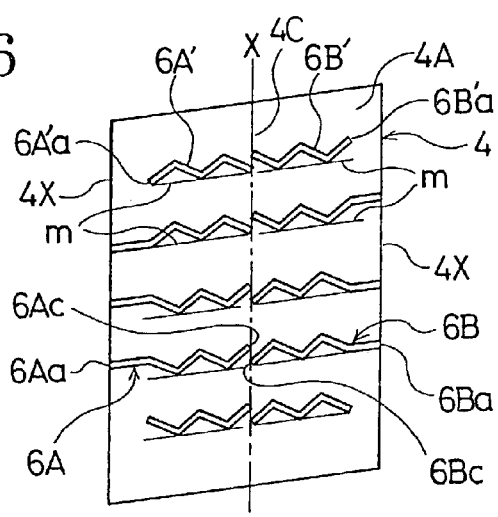
FIG. 6 is an enlarged view of a block having another alternative pairs of sipes.
Figure 7:
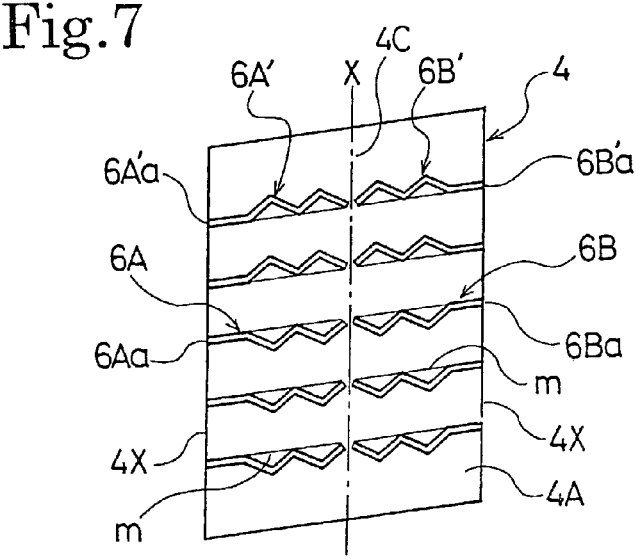
FIG. 7 is an enlarged view of a block having another alternative pairs of sipes.
Figure 8:
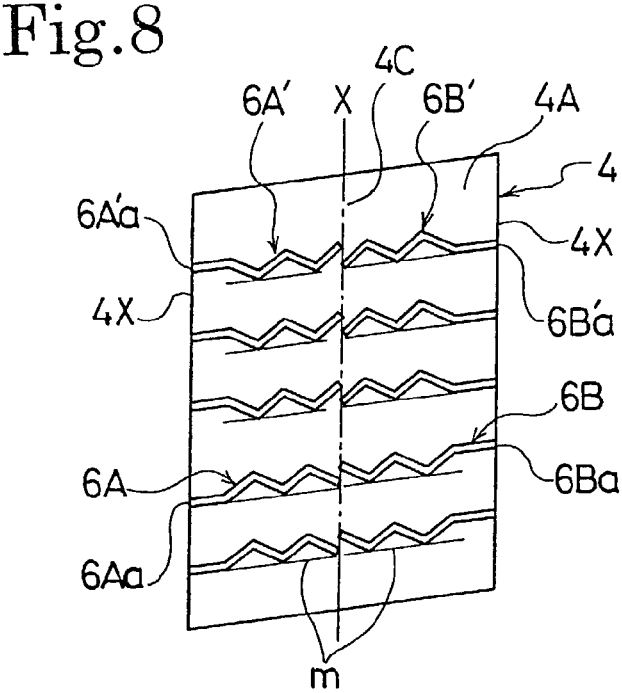
FIG. 8 is an enlarged view of a block having another alternative pairs of sipes.

The zig zag orientation of the left and right sipes 6A and 6B, as shown in FIGS. 5 and 7, may be arranged such that the left and right sipes 6A and 6B zig zag in the same direction from the inner ends 6Ac and 6B thereof. The left and right sipes 6A and 6B, as shown in FIGS. 6 and 8, may also be in the form of zig zaging in the opposite directions from the inner ends 6Ac and 6B thereof.

The depth of the left and right sipes 6A and 6b mentioned above may be 60% to 80% of the depth of the main grooves 2. If the depth of the left and right sipes 6A and 6B is shallower than 60% of the depth of the main grooves 2, it is difficult to maintain good iced and snowed road running performance after 50% tread wear. If the depth of the left and right sipes 6A and 6B is deeper than 80% of the depth of the main grooves 2, a decrease in iced road surface running performance occurs because of greatly lowering the block rigidity. As shown in FIGS. 7 and 8, the two outer left and right sipes 6A' and 6B' the outer ends 6A'a and 6B'a of which are opened to the side faces 4X of the block 4 may have a depth of 15% to 25% of the depth of the main grooves 2.

It is preferable, in terms of effectively improving iced road surface running performance and uneven wear resistance, that the inner ends 6Ac and 6Bc of the left and right sipes 6A and 6B of each pair are spaced apart in a range of 0.3 mm to 3 mm. If the spaced distance is shorter than 0.3 mm, it is difficult to improve uneven wear resistance due to lowering of uniformity of the block rigidity. If the spaced distance is longer than 3 mm, the edge amount of the sipes decreases, thereby degrading the edge effect of the sipes.

The shoulder portions 1B are more vulnerable to uneven wear than the center portion 1C due to a greater force applied to the shoulder portion 1B during turning. It is, therefore, preferable, in terms of uneven wear resistance, that the inner ends 6Ac and 6Bc of each pair of left and right sipes 6A and 6B provided on the ground contact face 4A of each block 4 in the rows of blocks 5E and 5F positioned in the shoulder portions 1B, be spaced apart 1 mm or more when measured along the tire width direction.

Preferably, the ground contact face 4A of each block 4 may have at least three pairs of left and right sipes 6A and 6B. More preferably, the ground contact face 4A of each block 4 may have at least four pairs of left and right sipes 6A and 6B to locate a plurality of pairs of left and right sipes 6A and 6B in the intermediate area.

The tread rubber portion 1X having the tread surface 1 may comprise a low hardness rubber of 40 to 60 JIS A hardness at 0° C., and preferably 45 to 55. The ratio of the groove area to the area of the tread surface 1 may be 25% to 45%, and preferably 30% to 40%.

EXAMPLE

Figure 9:
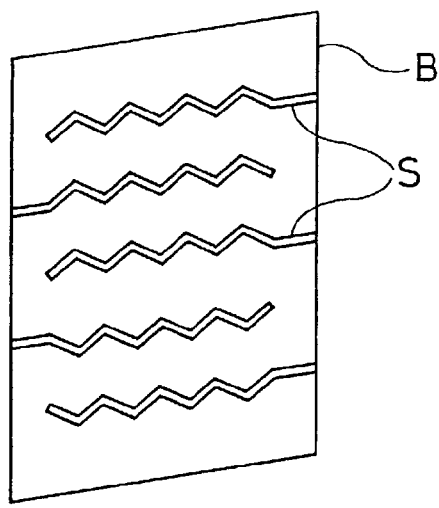
FIG. 9 is an enlarged view of a block having conventional sipes.

Tires according to the present invention tires 1, 2, 3, and 4, and the prior art tire were produced, having an equal tire size of 195/65R15, the tires of the present invention tire 1 having a block pattern shown in FIG. 1 in which each block had left and right sipes shown in FIG. 7, the tires of the present invention tire 2 having the same construction as the present invention tire 1 except that left and right sipes were offset with respect to the tire circumferential direction, the tires of the present invention tire 3 having a block pattern shown in FIG. 1 in which each block had left and right sipes shown in FIG. 5, the tires of the present invention tire 4 having the same construction as the present invention tire 3 except that each block in the shoulder portions had left and right sipes the inner ends of which were spaced apart 1 mm when measured along the tire width direction, the tires of the prior art tire having a block pattern shown in FIG. 1 in which each block had conventional sipes shown in FIG. 9.

The distances between the inner ends of each pair of left and right sipes were 0.5 mm for the present invention tire 1, 1 mm for the present invention tire 2, 0.5 mm for the present invention tire 3, 0.5 mm in the center portion and 1 mm in the shoulder portions for the present invention tire 4.

Each test tire was attached to a 15×6.5JJ sized rim, and mounted to a rear wheel driven car of 2000cc displacement with an anti-lock braking system. The evaluation tests of iced road surface running performance and uneven wear resistance were performed in the following measurement methods, obtaining the results shown in Table 1.

[Iced Road Surface Running Performance]

When running the test course covered with ice and snow straight at 40 km/h, braking was applied to stop the car, and the braking distance up to stopping was measured five times. The mean value of three measurement values except maximum and minimum measurement values was made the braking distance, and each result of the present invention tires was evaluated in the index, on the basis of the prior art tire as 100. The greater the index is, the shorter the braking distance is.

[Uneven Wear Resistance]

After running the test course, comprising a dry paved road, 8000 km at an average speed of 35 km/h, uneven wear amounts produced on the blocks were measured, and each result of the present invention tires was evaluated in the index, on the basis of the prior art tire as 100. The greater the index is, the higher the uneven wear resistance is.

TABLE 1

|  | Iced Road Surface Running Performance | Uneven Wear Resistance |
| --- | --- | --- |
| Prior Art Tire | 100 | 100 |
| Present Invention Tire 1 | 105 | 105 |
| Present Invention Tire 2 | 109 | 105 |
| Present Invention Tire 3 | 114 | 108 |
| Present Invention Tire 4 | 114 | 112 |

As can be seen from Table 1, it is understood that the present invention tires can improve iced road surface running performance and uneven wear resistance.

As mentioned above, according to the present invention, the ground contact faces of the blocks have a plurality pairs of sipes comprising a left sipe and a right sipe which extend in the tire width direction, the plurality pairs of sipes are placed in a predetermined interval in the tire circumferential direction, and each of the left and right sipes of each pair extending from a width-directional center portion of the ground contact face of the block towards each way of the tire width direction so as to open its outer end to each side face of the block, thereby allowing iced road surface running performance and uneven wear resistance to be improved.

What is claimed is:

1. A pneumatic tire for use on iced and snowed road surfaces having a tread surface, the tread surface comprising:
   a plurality of main grooves extending in a circumferential direction of the tire and a plurality of lateral grooves extending in a width direction of the tire,
   blocks being defined by said main grooves and said lateral grooves, the blocks having a ground contact face which has a plurality of pairs of sipes comprising a left sipe and a right sipe extending in the tire width direction,
   the plurality of pairs of sipes being placed in a predetermined interval in the tire circumferential direction, each of the left and right sipes of each pair extending from a width-directional center portion of said ground contact face of the block toward each way of the tire width direction so as to open its outer end to each side face of the block,
   wherein said plurality of main grooves comprise five main grooves, six rows of blocks being defined by the five main grooves, the tread surface having a center portion and two shoulder portions, the center portion having four rows of blocks, each of the shoulder portions having one row of blocks,
   the ground contact face of each block in two inner rows of blocks of said four rows of blocks in the center portion having the plurality of pairs of left and right sipes, the left and right sipes of each pair having an inner end portion which extends beyond a centerline in said width-directional center portion of the block,
   the ground contact face of each block in two outer rows of blocks of said four rows of blocks in the center portion having the plurality of pairs of left and right sipes, the left and right sipes of each pair having an inner end which is located on said centerline,
   the ground contact face of each block in each of the two rows of blocks in the shoulder portions having the plurality of pairs of left and right sipes, the left and right sipes of each pair having an inner end portion which is spaced apart from said centerline.

2. A pneumatic tire for use on iced and snowed road surfaces according to claim 1, wherein the left and right sipes of each pair have an inner end, a distance between the inner ends of the left and right sipes being 0.3 mm to 3 mm.

3. A pneumatic tire for use on iced and snowed road surfaces according to claim 2, wherein said blocks includes blocks with said plurality of pairs of sipes provided in shoulder portions of said tread surface, the inner ends of the left and right sipes of each pair being spaced apart 1 mm or more from each other when measured along the tire width direction.

4. A pneumatic tire for use on iced and snowed road surfaces according to claim 1, wherein said plurality of pairs of sipes are three pairs or more.

5. A pneumatic tire for use on iced and snowed road surfaces according to claim 4, wherein said plurality of pairs of sipes comprise two pairs of left and right sipes positioned in both outermost locations in the tire circumferential direction, and one pair or more of intermediate left and right sipes between the two pairs of left and right sipes, the two pairs of left and right sipes having a depth of 15% to 25% of the depth of said main grooves, the one pair or more of intermediate left and right sipes having a depth of 60% to 80% of the depth of said main grooves.

6. A pneumatic tire for use on iced and snowed road surfaces according to claim 4, wherein said plurality of pairs of sipes include two pairs of left and right sipes positioned in both outermost locations in the tire circumferential direction, the outer ends thereof being positioned within the block.

7. A pneumatic tire for use on iced and snowed road surfaces according to claim 6, wherein the left and right sipes of each pair have a depth of 60% to 80% of the depth of said main grooves.

8. A pneumatic tire for use on iced and snowed road surfaces according to claim 1, wherein the left and right sipes of each pair are offset with respect to the tire circumferential direction.

9. A pneumatic tire for use on iced and snowed road surfaces according to claim 1, wherein the left and right sipes of each pair are arranged in a straight line.

10. A pneumatic tire for use on iced and snowed road surfaces according to claim 1, wherein the left and right sipes of each pair extend in a zig zag path.

11. A pneumatic tire for use on iced and snowed road surfaces according to claim 1, comprising a tread rubber portion having said tread surface, the tread rubber portion being formed of a rubber of 40 to 60 JIS A hardness.

* * * * *